United States Patent [19]

Bundy et al.

[11] E Patent Number: Re. 33,681

[45] Reissued Date of Patent: Sep. 3, 1991

[54] APPARATUS FOR MOUNTING A TRAILER HITCH ON A VEHICLE

[75] Inventors: Donald E. Bundy, Sapulpa; Ronald W. Bundy, Sand Springs, both of Okla.

[73] Assignee: Judd & Judd, Inc., Tulsa, Okla.

[21] Appl. No.: 170,433

[22] Filed: Mar. 18, 1988

Related U.S. Patent Documents

Reissue of:

[64] Patent No.: 4,634,163
Issued: Jan. 6, 1987
Appl. No.: 766,589
Filed: Aug. 19, 1985

[51] Int. Cl.[5] ..... B60R 19/48

[52] U.S. Cl. ..... 293/117; 280/500

[58] Field of Search ..... 293/117, 102; 280/163, 280/164.1, 500, 505

[56] References Cited

U.S. PATENT DOCUMENTS

| | | | |
|---|---|---|---|
| 2,515,920 | 3/1939 | Jandus et al. | 280/501 |
| 3,137,516 | 6/1964 | Cline | 293/117 X |
| 3,318,617 | 5/1967 | Burns | 280/500 |
| 3,427,062 | 2/1969 | Struben | 293/117 |
| 3,471,070 | 10/1969 | Olson | 280/164.1 X |
| 3,578,358 | 5/1971 | Reynolds | 280/500 |
| 3,580,613 | 5/1971 | Northrop | 293/117 X |
| 3,606,385 | 9/1971 | Jahannes | 280/500 X |
| 3,675,947 | 7/1972 | Blagg | 293/117 X |
| 4,023,823 | 5/1977 | Saunders | 280/515 |
| 4,109,930 | 8/1978 | Pihall | 280/491 B |
| 4,275,899 | 6/1981 | Humphrey | 280/500 X |

*Primary Examiner*—Russell D. Stormer
*Attorney, Agent, or Firm*—Laney, Dougherty, Hessin & Beavers

[57] ABSTRACT

Apparatus for mounting a trailer hitch on a vehicle. An elongate frame having a planar base includes a pair of ends upturned at an angle substantially less than ninety degrees. A pair of elongate planar support brackets extend at right angles to the base from each end. A rear vehicle bumper is mounted on the base opposite from the extended brackets which are used to mount the bumper-and-frame combination on a vehicle. The base includes a hole for mounting a trailer hitch thereon.

13 Claims, 2 Drawing Sheets

APPARATUS FOR MOUNTING A TRAILER HITCH ON A VEHICLE

Matter enclosed in heavy brackets [ ] appears in the original patent but forms no part of this reissue specification; matter printed in italics indicates the additions made by reissue.

BACKGROUND AND SUMMARY OF THE INVENTION

The instant invention pertains to apparatus for mounting a trailer hitch on a vehicle and more particularly to such apparatus which is secured to a vehicle and which includes means for mounting a trailer hitch thereon.

Such apparatus are known in the past. Devices such as those disclosed in U.S. Pat. No. 3,427,062 to Struben; U.S. Pat. No. 2,151,920 to Jandus et al; and U.S. Pat. No. 4,023,823 to Saunders each have a frame which is mounted on a vehicle frame and which is adapted to have a trailer hitch and a bumper mounted thereon. Each of the frames in these prior art devices is adapted to be bolted to the frame of a vehicle. When so mounted, each of the device frames includes a pair of elongate members mounted on the vehicle frame which extend rearwardly and inwardly therefrom. A hitch-mounting portion spans the rear ends of each of the elongate members and is adapted to have a trailer hitch bolted thereto. Such prior art device frames typically include means for mounting a rear vehicle bumper thereon.

Such prior art devices suffer from several deficiencies. First, the frame design is such that force applied thereto in the form of a heavy load under tow tends to distort the frame. Also, past techniques for mounting the bumper on the frame of the prior art apparatus have proved unsatisfactory and have not resulted in the securest possible mounting of the bumper on the frame.

The instant invention includes a substantially planar base having a hole therethrough for receiving a trailer hitch therein. When the apparatus of the invention is mounted on a vehicle, the base is substantially parallel to the road or other surface supporting the vehicle. On each side of the base, a substantially planar plate is connected thereto at an angle of substantially less than ninety degrees to the base. An elongate support bracket is mounted on each of the plates with a longitudinal axis of the brackets being substantially parallel to the base.

In another aspect of the invention, a bumper is fixedly mounted on the base.

The apparatus of the invention presents an advantage over the prior art in that it is less likely to distort when towing a heavy load. Another advantage is that a bumper may be fixedly secured to and supported by the elements of the apparatus which are adapted to support a trailer hitch.

These and other advantages will become more fully apparent when the following detailed description is read in view of the accompanying drawings wherein.

DETAILED DESCRIPTION OF THE PREFERRED EMBODIMENT OF THE INVENTION

Figure 1:
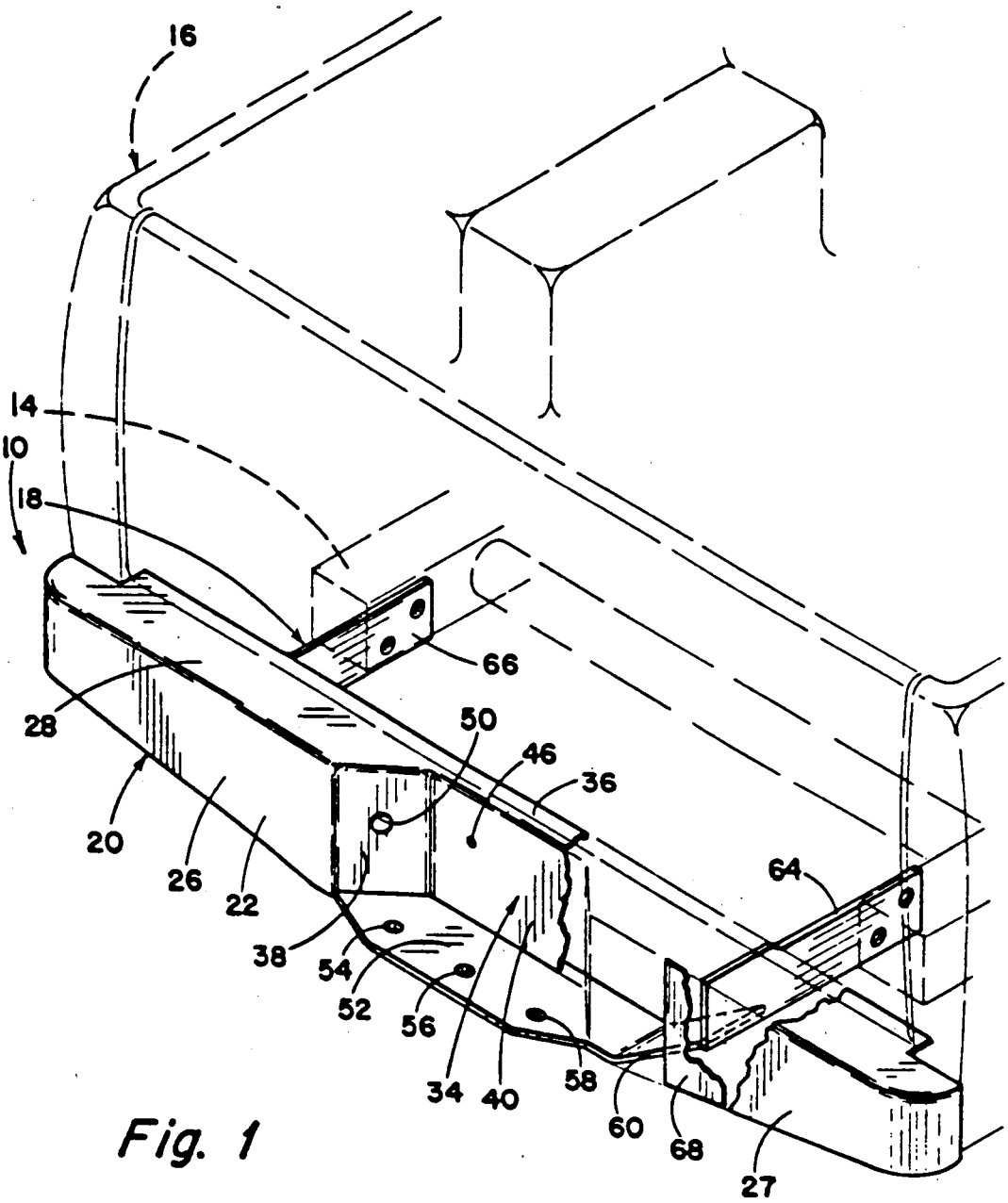
FIG. 1 is a perspective view of the preferred embodiment of the invention, with a portion thereof broken away, secured to the rear end of a truck.
Figure 2:
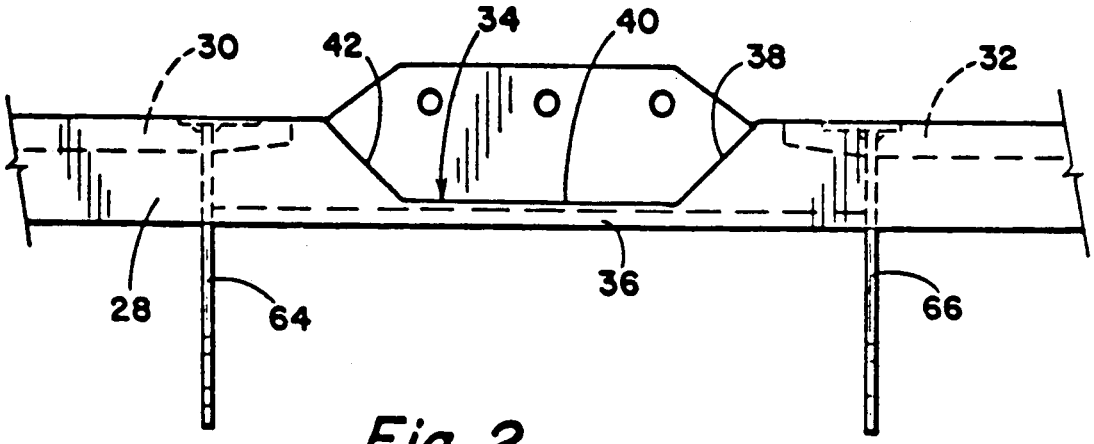
FIG. 2 is a top plan view of the preferred embodiment of the invention.

Indicated generally at 10 is a frame-and-bumper combination constructed in accordance with the instant invention. Combination 10 is shown in position for mounting on the rear end of a frame 14 on a truck 16. Combination 10 includes a frame 18 and a bumper 20.

Bumper 20 includes an outer surface 22, which in the instant embodiment of the invention is chrome plated. The bumper also includes an inner surface 24, best viewable in FIG. 3. The bumper is made up of a pair of substantially planar bumper elements 26, 27, an upper flange 28 and lower flanges 30, 32 (best viewable in FIG. 4). Also included is a central bumper portion 34.

Upper flange 28 extends across the width of the bumper and includes a narrowed portion 36 over central portion 34. The upper flange is at an angle of substantially ninety degrees to bumper elements 26, 27.

The central portion includes three upright plates 38, 40, 42 which are substantially normal to upper flange 28 and are securedly fixed thereto. Plate 40 includes a pair of holes 44, 46 which may be used to mount a license plate on the bumper. Holes 48, 50 are provided for supporting conventional lights for illuminating a license plate so mounted.

Frame 18 includes a base 52 having holes 54, 56, 58 therein. The base includes a pair of upturned ends or plates 60, 62. Elongate support brackets 64, 66 are welded to the outer ends of plates 60, 62, respectively as shown. *The plates 60, 62 may be connected to or mounted on each side of the base 52, i.e., one plate 60, 62 on each side of the base 52. The plates 60, 62 extend upwardly and outwardly from the sides of the base 52 at an angle of less than ninety degrees. Preferably, the base 52 and plates 60, 62 are formed from a single piece of metal.* The brackets include, viewable in FIG. 1, holes therein for mounting combination 10 on truck frame 14.

Figure 3:
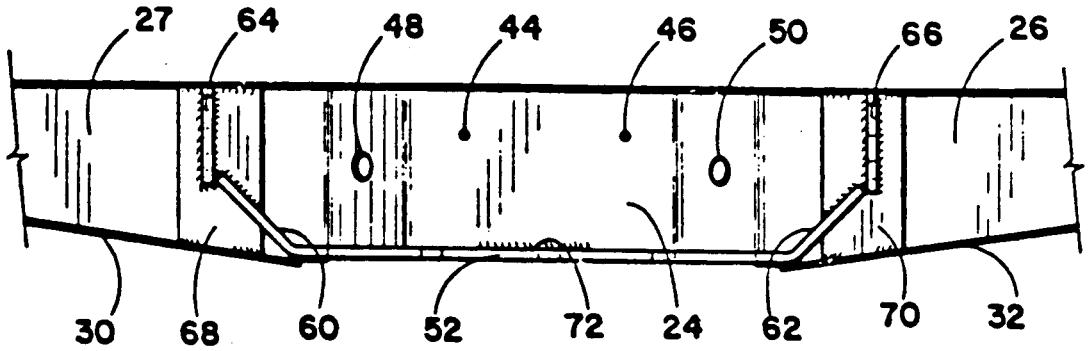
FIG. 3 is a view of the side of the preferred embodiment of the invention opposite that shown in FIG. 1.
Figure 4:
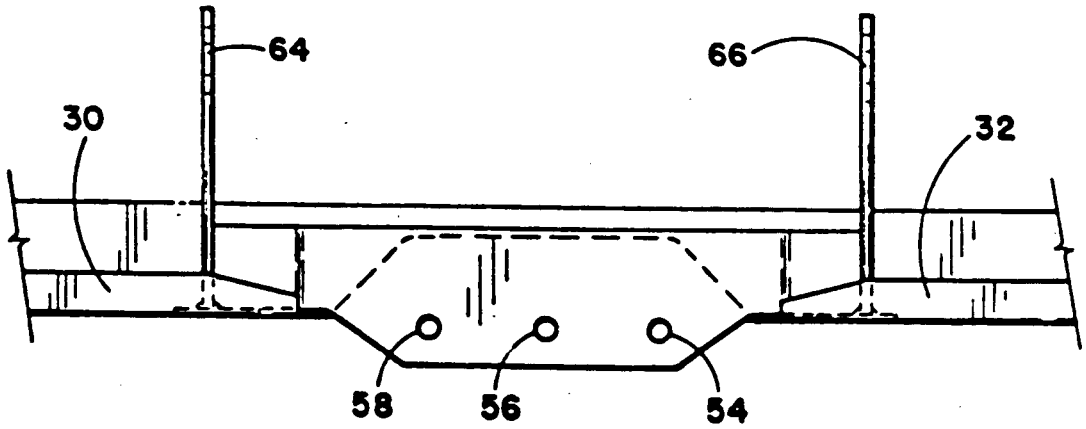
FIG. 4 is a bottom plan view of the preferred embodiment of the invention.

A bumper support element 68 comprises a substantially planar plate with a pair of opposing sides and an upper end which is normal thereto. The lower end of plate 68, best viewable in FIG. 3, is at an angle with respect to the parallel sides to permit the lower end of the plate to abut flush against flange 30. A similar bumper support element 70 is mounted on bracket 66 and plate 62 as shown. Welds at the upper and lower edges of bumper support elements 68, 70 secure the bumper to the plate and hence to frame 18. Another weld 72, in FIG. 3, secures the bumper directly to base 52.

In operation, bolts are used to secure combination 10 to truck frame 14 through the holes in support brackets 64, 66. Thereafter, a commercially available trailer hitch may be secured to base 52 via one or more of holes 54, 56, 58. Truck 16 may then be used to tow a heavy load without deformation of frame 18.

It is to be appreciated that modifications and additions may be made to the embodiment disclosed herein without departing from the spirit of the invention which is defined in the following claims.

We claim:

1. Apparatus for mounting a trailer hitch on a vehicle to enable the vehicle to tow a load on a surface supporting the vehicle, said apparatus being of the type which is securedly mountable on the vehicle and which is adapted to have a trailer hitch secured thereto, said apparatus comprising:

a substantially planar base having a hole therethrough for receiving a trailer hitch therein, said base being substantially parallel to the surface supporting the vehicle when said apparatus is mounted thereon, said base further having pair of opposing substantially parallel sides;

a substantially planar plate [mounted on] *connected to* each side of said base, each of said plates being at an angle of substantially less than ninety degrees to said base and extending upwardly and outwardly therefrom; and an elongate support bracket [mounted on the outer end of] *connected to* each of said plates, the longitudinal axes of said brackets being substantially parallel to said base.

2. The apparatus of claim 1 wherein said base and said plate are formed in a single piece of metal.

3. The apparatus of claim 1 wherein said base is elongate *and has a longitudinal base axis* and when said apparatus is mounted on the vehicle said base axis is substantially transverse to the longitudinal axis of the vehicle and each of said base sides is directed toward a different side of the vehicle.

4. The apparatus of claim 1 wherein said apparatus further includes a bumper support element mounted on each of said plates, said bumper support elements being substantially planar and having a surface facing opposite to said elongate support brackets.

5. The apparatus of claim 4 wherein said apparatus further includes a bumper mounted on said bumper support elements.

6. The apparatus of claim 5 wherein said bumper includes an outer surface and an inner surface, said inner surface being flush against one of said support elements and welded thereto.

7. The apparatus of claim 5 wherein said bumper includes a substantially planar portion which abuts against the upper surface of said base at an angle of substantially ninety degrees.

8. An apparatus for mounting a trailer hitch and a bumper on a vehicle comprising, when said apparatus is mounted on one end of a vehicle:

an elongate base having a hole through a substantially horizontal portion thereof for receiving a trailer hitch, the longitudinal axis of said base being substantially transverse to the longitudinal axis of said vehicle, said base further having a pair of upturned ends which from an angle of substantially less than ninety degrees with the substantially horizontal portion of said base and which extend upwardly and outwardly therefrom:

a substantially planar elongate bracket [mounted on the outer end of] *connected to* each of said upturned ends, said bracket being at an angle of substantially ninety degrees to the horizontal portion of said base, said bracket further having one end mounted on the frame of said vehicle, and a substantially planar bumper element mounted on the rear of said base at an angle of substantially ninety degrees thereto.

9. The apparatus of claim 8 wherein said apparatus further includes a central bumper portion having a lower end abutted against the upper surface of said plate, said portion forming an angle of substantially ninety degrees with said plate.

10. The apparatus of claim 9 wherein said apparatus further includes an upper flange mounted on top of said planar bumper element and said central bumper portion, said flange being substantially parallel to said base and extending toward the vehicle.

11. The apparatus of claim 8 wherein said apparatus further includes a lower flange mounted on the bottom of said planar bumper element and extending toward the vehicle beneath said base.

12. The apparatus of claim 8 wherein said substantially planar bumper element includes a portion which extends downwardly over the rear edge of said base.

13. The apparatus of claim 8 wherein said apparatus further includes a bumper support element mounted on the rear of said base at an angle of substantially ninety degrees to the horizontal portion of said base, said element being substantially planar and having an inner surface of said substantially planar bumper element mounted thereon.

* * * * *